United States Patent
Venkataramani et al.

(10) Patent No.: US 11,921,849 B2
(45) Date of Patent: Mar. 5, 2024

(54) REUSE-TRAP: RE-PURPOSING CACHE REUSE DISTANCE TO DEFEND AGAINST SIDE CHANNEL LEAKAGE

(71) Applicant: The George Washington University, Washington, DC (US)

(72) Inventors: Guru Prasadh Venkataramani, Fairfax, VA (US); Miloš Doroslovački, Washington, DC (US); Hongyu Fang, Bethesda, MD (US)

(73) Assignee: The George Washington University, Washington, DC (US)

( * ) Notice: Subject to any disclaimer, the term of this patent is extended or adjusted under 35 U.S.C. 154(b) by 220 days.

(21) Appl. No.: 17/181,197

(22) Filed: Feb. 22, 2021

(65) Prior Publication Data

US 2021/0264027 A1    Aug. 26, 2021

Related U.S. Application Data

(60) Provisional application No. 62/979,178, filed on Feb. 20, 2020.

(51) Int. Cl.
  *G06F 21/55* (2013.01)
(52) U.S. Cl.
  CPC ...... *G06F 21/554* (2013.01); *G06F 2221/034* (2013.01)
(58) Field of Classification Search
  CPC . G06F 21/554; G06F 2221/034; G06F 21/556
  See application file for complete search history.

(56) References Cited

U.S. PATENT DOCUMENTS

| | | | | |
|---|---|---|---|---|
| 9,940,239 | B1* | 4/2018 | Drerup | G06F 12/128 |
| 10,628,589 | B2* | 4/2020 | Werner | G06F 21/53 |
| 11,630,920 | B2* | 4/2023 | Durham | H04L 9/002 |
| | | | | 713/189 |
| 11,775,635 | B2* | 10/2023 | Jiang | G06N 5/04 |
| | | | | 726/23 |
| 2008/0147992 | A1* | 6/2008 | Raikin | G06F 12/0833 |
| | | | | 711/146 |
| 2016/0210230 | A1* | 7/2016 | Wang | G06F 12/0848 |
| 2018/0060568 | A1* | 3/2018 | Galenson | G06F 21/554 |
| 2019/0130104 | A1* | 5/2019 | Carlson | G06F 21/755 |
| 2021/0406411 | A1* | 12/2021 | Amato | G06F 12/1408 |
| 2022/0027461 | A1* | 1/2022 | Bhat | G06F 12/1433 |
| 2023/0110049 | A1* | 4/2023 | Bhalerao | G06F 21/554 |
| | | | | 726/22 |

OTHER PUBLICATIONS

Fang et al, "Reuse-trap: Re-purposing Cache Reuse Distance to Defend against Side Channel Leakage", 2020, IEEE, p. 1-6.*
Q. Wang, et al., "Featherlight Reuse-Distance Measurement", 2019 IEEE International Symposium on High Performance Computer Architecture (HPCA), IEEE Computer Society, pp. 440-453.

\* cited by examiner

*Primary Examiner* — Christopher A Revak
(74) *Attorney, Agent, or Firm* — Blank Rome LLP (57) ABSTRACT

A system for defending against a side channel attack. The system includes a reuse distance buffer configured to measure one or more reuse distances for a microarchitecture block according to information of marker candidates and information of target events of a microarchitecture block; and a defense actuator configured to determine existence of a side channel attack in the microarchitecture block according to the one or more reuse distances for the microarchitecture block.

18 Claims, 8 Drawing Sheets

FIG. 8

REUSE-TRAP: RE-PURPOSING CACHE REUSE DISTANCE TO DEFEND AGAINST SIDE CHANNEL LEAKAGE

CROSS-REFERENCE TO RELATED APPLICATIONS

This application claims the benefit of priority of U.S. Provisional Application Ser. No. 62/979,178 filed on Feb. 20, 2020, the content of which is relied upon and incorporated herein by reference in its entirety.

SPONSORED RESEARCH

This invention was made in part with Government support under award 1618786 from national science foundation (NSF). The U.S. Government has certain rights in this invention.

FIELD

The disclosure relates generally to the field of defense against side channel attacks and more particularly to a method and a system for defending against side channel attacks.

BACKGROUND

Cache side channel attacks are used by spy processes to capture victim's secrets through interfering with the victim's cache access patterns. The spy leverages the latency difference of cache accesses to memory lines in different status. The spy infers the victim's behavior based on the direct or indirect measuring the timing of cache access.

For a typical cache timing channel attack, there are three phases to complete a single iteration of information stealing: preparation, transmission, reception. During the preparation phase, the spy removes the critical memory lines from cache to guarantee that the access to the memory line by victim is observable to the spy.

The second phase of the spy is to stay idle and wait for the victim to finish its activity. With the preparation in the first phase, the victim's activity would change the cache status.

In the third (reception) phase of cache timing channel attack, the spy tries to observe the cache status change caused by the victim by measuring the cache access latency.

SUMMARY

A system and method to detect and obfuscate microarchitecture side channels exploiting shared hardware. Microarchitecture side channels are notorious for their ability to leak information without leaving traces for physical observation. Most prior detection frameworks typically choose to continuously sample a select subset of hardware events without attempting to understand the mechanics behind the side channel activity and implementation. To detect and obfuscate microarchitecture side channels, embodiments disclosed herein provide methods to observe the events behind side channel activity, and synchronize the detection frequency of embodiments to identify presence of microarchitecture side channels and counter microarchitecture side channels effectively.

There may be two processes involved in the microarchitecture side channels: a victim process which leaks its secret unintentionally through its accesses to microarchitecture units and a spy process which tries to infer the victim's secret by observing the status changes in the units.

A typical iteration of information leakage in side channel may include three phases: spy's setup, victim's leakage, spy's observation. In spy's setup phase, the adversary manipulates microarchitecture so that the secret-dependent activities of the victim would create observable status change in the vulnerable microarchitecture. In victim's leakage phase, the victim executes its secret-dependent instructions. Due to spy's setup, different activities of the victim would lead to different microarchitecture status changes. In spy's observation phase, the adversary manages to observe secret-dependent microarchitecture status. The attacker can either time the execution of the victim or measure the latency to the exploited functional unit. From the observation, the attacker recovers the victim's secrets/activities.

Disclosed embodiments herein include observing repetitive interference between two involved processes by recording reuse distance. A critical event which appears in one of the three phases above is defined as marker event. Target events are a series of events that occur in between marker events. Reuse distance is defined as the number of target events between two consecutive marker events. The number of positive reuse distance is used to evaluate observed process. A large number of positive reuse distance indicates the existence of microarchitecture side channels. Definition of marker events and target events may vary on detection of different types of microarchitecture side channels. This method provides robust protection against microarchitecture with different frequencies. This method supports detection of side channel occurred in various types of microarchitecture.

An exemplary embodiment provides a method for identifying a generic microarchitecture side channel based on observed reuse distance. The method includes configuration of marker event and target event based on adversary. The method further includes analysis of observed reuse distance.

Another exemplary embodiment provides a system for identifying cache side channels based on observed reuse distance. The system includes hardware design of the detector. The system observes events from shared cache. The system further records reuse distance based on the observations.

Another exemplary embodiment provides a system for identifying speculation-based side channels based on observed reuse distance. The system includes hardware design of the detector. The system observes events from shared cache and reorder buffer. The system further records reuse distance based on the observations.

Another exemplary embodiment provides a system for identifying branch predictor side channels based on observed reuse distance. The system includes hardware design of the detector. The system observes events from branch predictor.

The system further records reuse distance based on the observations.

DETAILED DESCRIPTION

A detection framework against microarchitecture side channels is provided. The framework can smartly tune and synchronize its sampling frequency of microarchitectural events based on the adversarial activity. The synchronization increases the detection accuracy especially when the attack frequency is unknown. A three-phase model is incorporated into our framework design to capture the victim's activity in between the setup and observation phases of the adversary (spy). The detection framework synchronizes itself with the side channel by tracking the repetitive critical events in side channels and recording statistics between two consecutive critical events. The detection framework is a reuse-trap framework, indicating that the detection framework includes a detector that can capture suspicious activities of the adversary by tracking its repetitive events according to the reuse distance.

It is observed that the amount of information leakage in a single iteration of side channel is limited, the spy typically has to repeat similar activity pattern to extract sufficient and accurate information. The detection framework is capable of self-synchronizing itself to the attack frequency since the sampling is dynamically adjusted based on the occurrence of the key adversarial events. The detection framework provides information of exploited hardware resource which supports defense-after-detection strategy with low overhead.

I. Microarchitecture Side Channels

The term "side channel" (i.e., "side channel attack") is used herein to denote an attack relying on shared microarchitecture (e.g., a cache, a branch predictor) to leak information.

A branch predictor predicts the direction and the target address of branch instructions, so that a processor can speculatively execute the following instructions before the branch instruction is resolved.

A branch predictor is shared among hyperthreads running on a same physical core. BranchScope manipulates the status of 2-bit branch predictor to infer the direction of the victim branch.

Table 1 shows a strategy of the spy (e.g., a spy process), where "T" denotes a taken branch, "N" denotes a non-taken branch, "M" denotes a miss indicating that direction outcome of the branch instruction is mispredicted, and "H" denotes a hit indicating that the direction outcome of the branch instruction is correctly predicted. The spy executes a branch which maps to the same branch prediction entry as that of the victim. In the prime phase, the spy executes its branches in the same direction for three times to train the predictor in a certain way. After victim's activity (act.), the spy probes the branch predictor entry by executing its branch twice in the opposite direction of the prime phase. By measuring misprediction rates, the adversary infers the victim's branch activity and infers its secret.

TABLE 1

| a strategy of spy | | | |
|---|---|---|---|
| Spy Prime | Victim Act. | Spy Probe | Branch Prediction Result of Probe |
| TTT | N | NN | MH |
| TTT | T | NN | MM |
| NNN | N | TT | MM |
| NNN | T | TT | MH |

A translation lookaside buffer (TLB) caches or stores the virtual-physical address mappings. The adversary exploits TLB to steal information by occupying the TLB set where the victim virtual address maps. If the victim process accesses the virtual address, the translation result may be stored in the occupied TLB set and evicts one of the spy's translation entries. The adversary observes the TLB eviction and infers the activities of the victim.

The latency gap between cache and main memory can be exploited by cache timing channel to infer the memory access pattern of a victim process. Flush+reload is an instance of cache timing channel implementation where the spy process flushes the memory lines shared with the victim. The spy reloads all flushed memory lines and measures the access latency after the activities of the victim. Low access latency of a memory line indicates that the victim has accessed the memory lines.

Modern processors execute instructions speculatively before validity of certain instructions is assured (pening branch outcomes, outstanding loads to memory etc.). Prior works demonstrated that the speculative execution and the cache timing channel can be combined to launch powerful attacks, which can read the values of memory lines owned by operating system (OS) kernel or other processes directly. The speculation-based attack leverages the phenomenon that the cache status changed by a mis-speculative load instruction would not be rolled back after the instruction is squashed from Reorder Buffer (ROB). The spy leverages a mis-speculated load instruction to bring a memory line in the exploited array whose address is dependent on the value of target secret. When the speculation is proved to be invalid, the cache status changed by the mis-speculative loads would not be undone so that the spy can leverage cache timing channel to observe the secret-dependent cache status change and recover the secret value of the victim process.

Figure 1:
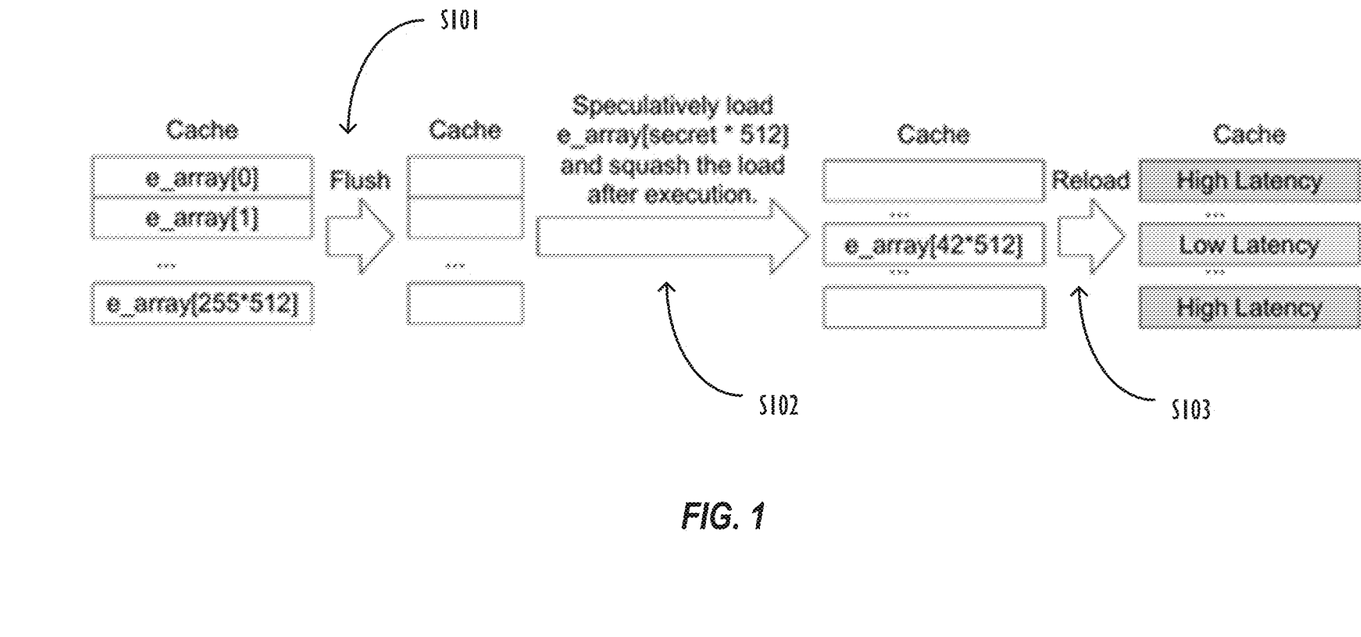
FIG. 1 shows steps of an example speculation-based attack using flush+reload cache timing channel.

FIG. 1 show steps of an example speculation-based attack using flush+reload cache timing channel. The spy process firstly allocates a large exploited array (represented by e_array) in main memory and flushes all elements in the array from cache (S101 in FIG. 1). In some examples, the main memory may be in a lower-level in the memory hierarchy below caches, and when data is evicted from caches due to insufficient capacity or flush instructions, the data is written out to the main memory. The spy triggers a mis-speculative load that accesses a memory line in exploited array whose index is dependent on the secret value; and the instruction may be proved invalid and squashed after its execution while the secret-dependent memory line (e_array[42*512] in this instance) remains in the cache (S102 in FIG. 1). The spy reloads all elements in exploited array and measures the cache access latency (S103 in FIG. 1). If low latency is observed when a memory line is accessed, the spy can infer or determine that the memory line is brought to the cache by the mis-speculated load. Based on the index of the memory line, the spy can recover the value of the secret of the victim process.

II. System Design

Figure 2:
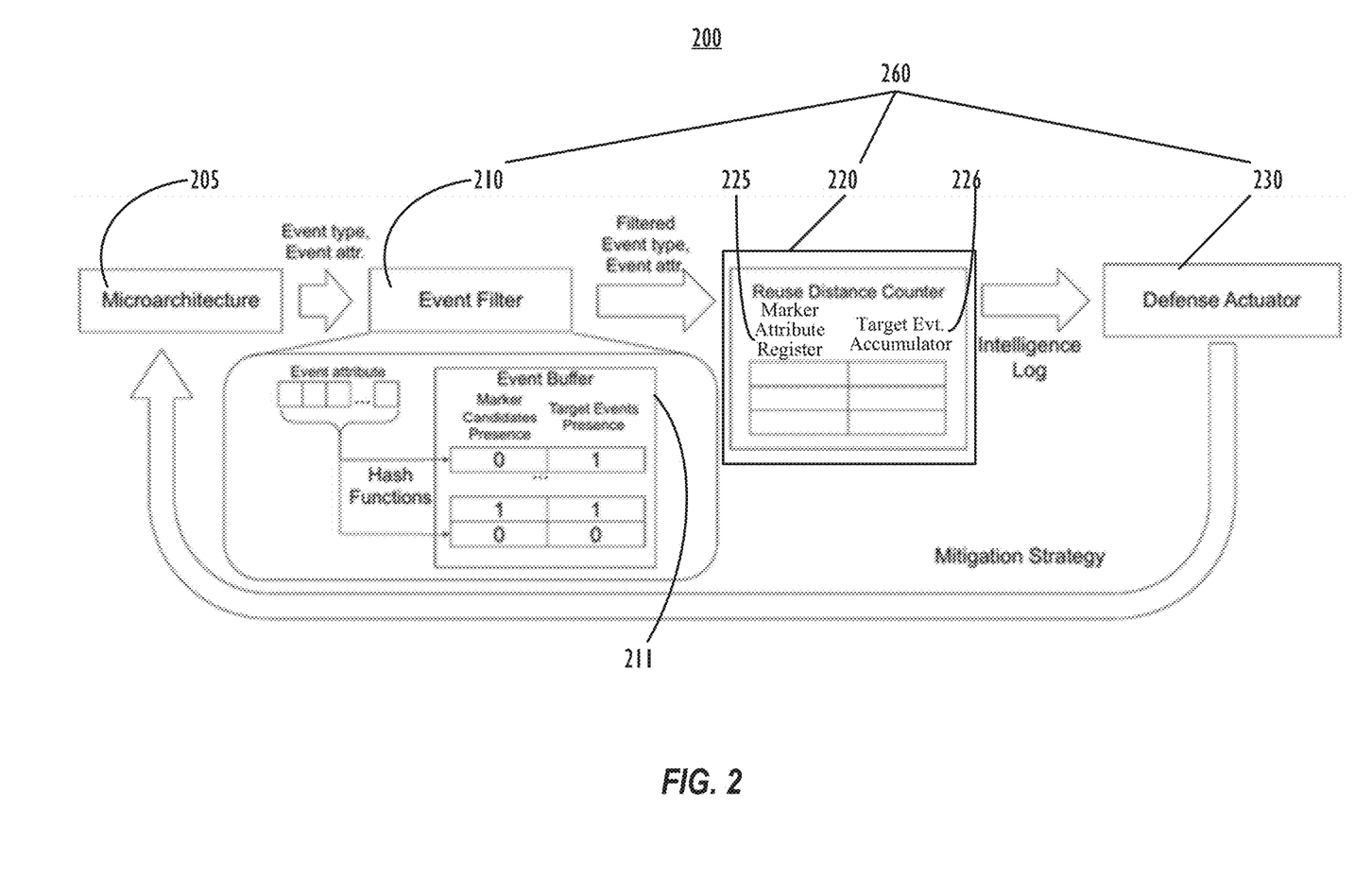
FIG. 2 is a schematic diagram of an example defense system 200 for defense against timing channel attacks according to various disclosed embodiments.

FIG. 2 is a schematic diagram of an example defense system 200 (also referred to as "SC-K9") for defense against timing channel attacks according to various disclosed embodiments. The system 200 includes an event filter 210 (e.g., an event filter circuit or module), and the event filter 210 records the presence of marker candidate and target event in the surveillance areas of microarchitecture. An area of microarchitecture may also be referred to as a "microarchitecture block." The event filter 210 may be an event filter circuit or module that guides defenses in identifying the candidate regions within the microarchitecture unit (caches, branch predictor) for surveillance purposes through identifying how and where both marker and target events occur. These events are used in reuse distance analysis. Reuse distance buffer 220 (e.g., a reuse distance buffer circuit or module) measures the reuse distance of filtered marker candidates. The reuse distance buffer 220 may be a reuse distance buffer circuit or module configured to measure and record reuse distance values. Recorded reuse distances are sent to a defense actuator 230 (e.g., a defense actuator circuit or module). The defense actuator 230 identifies adversarial events and contexts, and deploys mitigation strategy based on the intelligence or information received from reuse distance buffer 220. The defense system 200 includes a detector 260, and the detector 260 includes the event filter 210, the reuse distance buffer 220, and the defense actuator 230.

A. Event Filter

In some examples, the event filter 210 observes event from microarchitecture 205 and identifies microarchitecture areas where both marker candidate and target event are present. The microarchitecture 205 may be, for example, a cache, a branch predictor, etc. The surveillance area of microarchitecture is distinguished by one or more identifies (IDs) of the entries. For example, the surveillance area of cache, TLB and branch predictor are defined by a set ID which is indexed by the addresses of target memory lines (e.g., for cache, TLB) or an instruction pointer (e.g., for branch predictor).

The event filter 210 filters events based on the presence of two types of events in each region (or area). An event buffer 211 (e.g., an event buffer module or circuit) built inside the event filter 210 leverages or causes two Bloom filters to track the presence of marker candidates and target events respectively. A Bloom filter may contains 2^m slots and k distinct hash functions where each of them hashes the original n-bit area ID into m bits. To insert a new area (device or cache set) ID into Bloom filter, the information is hashed by all k hash functions and the bit value hashed by each m-bit ID is obtained. To check whether an area ID is present in Bloom filter, the hashed bit values are checked in the Bloom filter. If one of the hashed bit values is zero, the area ID is not present in the Bloom filter. If all of the hashed bit values are set, the area ID is probably present. In case of a hit, the event attributes would be forwarded to the reuse distance buffer. The Bloom filters may be reset periodically to avoid increasing false hits.

B. Reuse Distance Buffer

The reuse distance buffer 220 leverages groups of registers to measure the reuse distance. Each group of registers measures reuse distance within a surveillance area of hardware. Each group of registers includes two components: a marker attribute register 225, and a target event accumulator 226. The marker attribute register 225 holds or stores the addresses and/or the owner identities (IDs) of memory lines or instructions. The target event accumulator 226 counts the number of target events occurred in the surveillance area.

In some examples, in response to a new target event being observed, the target event accumulator 226 of the surveillance area is increased.

In some examples, in response to a new marker candidate being observed in a surveillance area that is not monitored, the reuse distance buffer 220 store the marker attribute in the marker attribute register 225, record the current value of target event accumulator 226, and start reuse distance measurement.

In some examples, in response to a new marker candidate that has the same attribute with the currently monitored candidate in the surveillance area being observed, e.g., a repetitive marker candidate being observed, the reuse distance buffer 220 records the value in target event accumulator 226 between two observations of these two marker candidates as the reuse distance, and forwards the reuse distance and the attribute of the marker candidate to the defense actuator 230.

In some examples, in response to a new marker candidate that has different values with the currently monitored marker candidate in the surveillance area being observed, the marker candidates providing positive reuse distance may be tracked. Positive reuse distance may be an observed reuse distance that is larger than zero, indicating at least one target event has occurred between a pair of marker candidates. In some examples, if the new marker candidate is different than the currently tracked marker candidate, one of them may be further tracked. The new marker candidate has probability of 1/(N+2) to replace the currently monitored marker candidate where N is the increment of the target event accumulator since the last observation of the currently monitored marker candidate.

C. Defense Actuator

The defense actuator 230 identifies processes involved in side channels and deploys mitigation strategy against detected side channels. To identify side channels using recorded reuse distances, the defense actuator 230 maintains a table with two columns: a column for security domain ID and another column for the number of positive reuse distance samples. When the reuse distance of given domain is received from the reuse distance buffer 220, the table is updated. When the number of positive reuse distance samples within a security domain exceeds a predetermined threshold, it is considered or determined that the security domain involves potential side channel activity and more high assurance detection and subsequent defense mechanisms are invoked.

Defense/mitigation varies based on actual attacks. In some examples of cache side channel, given the address of the exploited memory line, hardware prefetcher can obfuscate the observation of the spy process and make the leaked information too noisy to recover. For other microarchitecture like branch predictor and TLB, the defense actuator can obfuscate side channel by flushing the resources of the spy or partition the involved processes once the identity of the spy and the attributes of exploited resources are detected by the defense system 200.

III. Implementation Against Cache Side Channel

Figure 3:
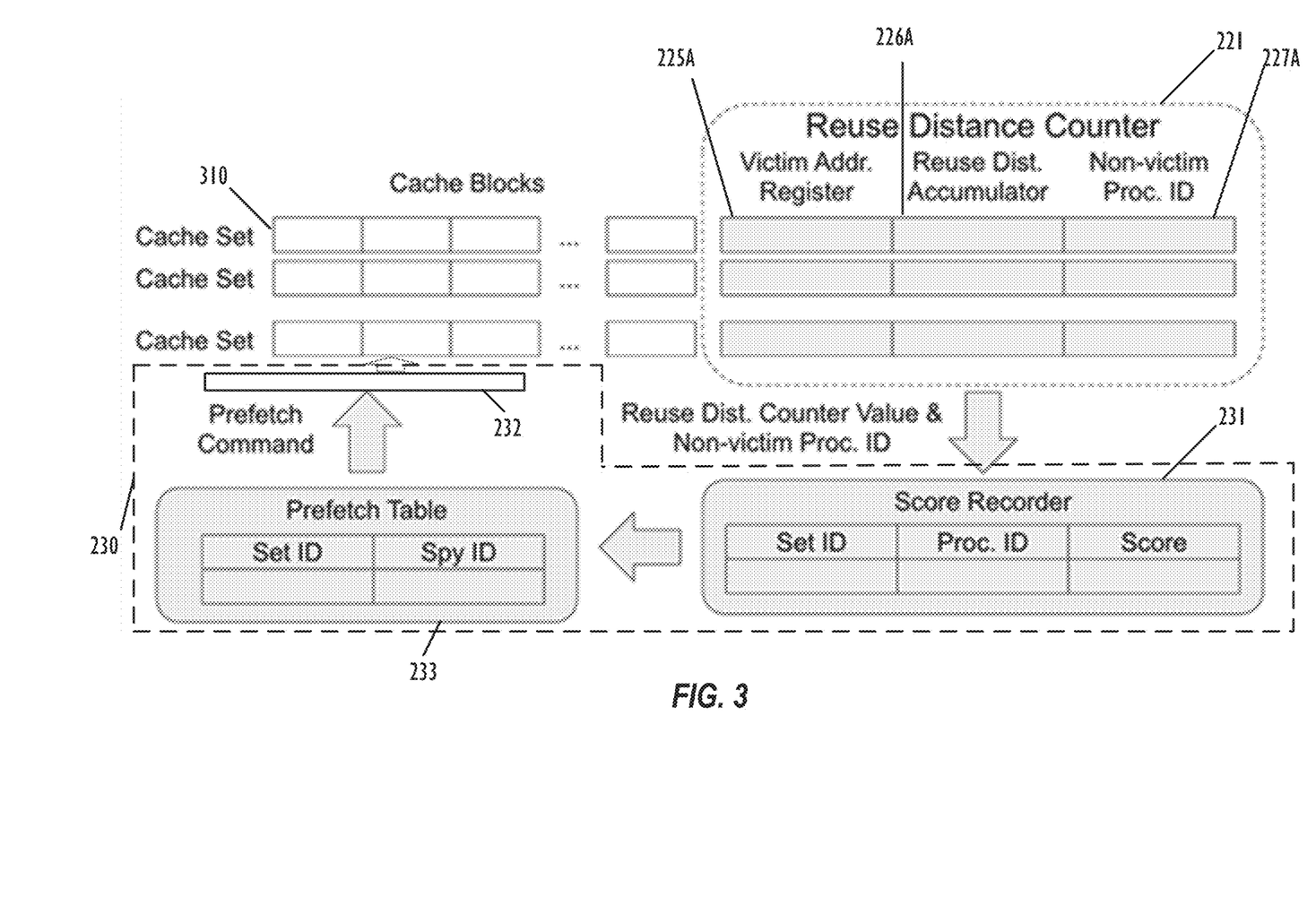
FIG. 3 shows an overview of an example implementation of the defense system 200 against cache side channel according to various disclosed embodiments.

FIG. 3 shows an overview of an example implementation of the defense system 200 against cache side channel. Certain process with secrets is considered as a potential victim, and is already known to the system 200. The defense system 200 may count reuse distances in each cache set 310. One or more values of reuse distance counter 221 are sent to a score recorder 231 which identifies potential spies and cache sets exploited by the spy. The score recorder 231 may be included in the defense actuator 230. In response to abnormal pattern of reuse distance being detected, the cache set indices and the ID of corresponding spy process may be sent to the prefetch table 233, and the prefetcher 232 may further initiate defense mechanisms to obfuscate the observed latency of the spy. The prefetcher 232 of the system 200 may include hardware configured to obfuscate the observed latency of the spy. In some examples, the prefetcher 232 may be included in the defense actuator 230. The prefetch table 233 may be included in the defense actuator 230. The prefetch table 233 may be configured to determine what prefetch command to deliver to prefetcher 232 to obfuscate side channels.

A. Reuse Distance Measurement

Measuring the cache reuse distance may involve three components: a register 225a to store the victim address, an accumulator 226a, and a register 227a for storing or holding the ID of the non-victim process. In response to an address of newly missed memory line matching the address in the register 225a that stores the victim address, a reuse distance is recorded. The accumulator 226a may count the number of cache misses of the non-victim process before the subsequent access on the cache set by the victim. In response to a cache miss from victim occurring, the victim address may be sent to the empty victim address register 225a. When a cache miss from non-victim process occurs, and if the victim address register 225a is not empty, the process ID may be stored in the empty non-victim process register 227a.

Figure 4:
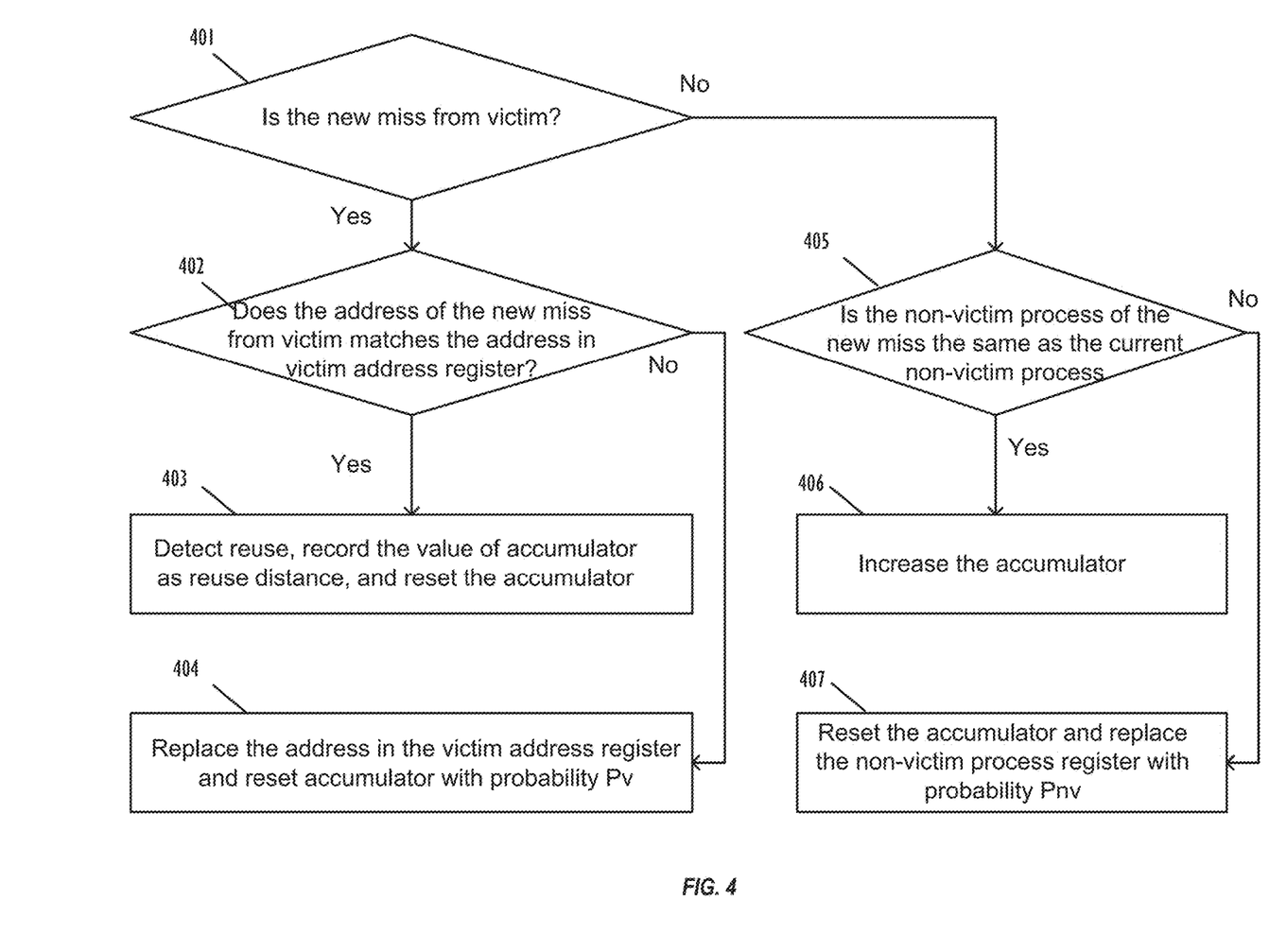
FIG. 4 shows a flowchart of reuse distance counting according to various disclosed embodiments.

FIG. 4 shows a flowchart of reuse distance counting after both counters are filled according to the present disclosure, where both counters refer to the register 225a (FIG. 3) for recording victim addresses and the register 227a (FIG. 3) for storing or holding the ID of the non-victim process. At 401, it is determined whether the new miss is from victim. If the miss is from victim (e.g., a victim process), it is determined whether the address of the new miss (i.e., incoming miss) from victim matches the address in victim address register (402). In response to the address of the new miss from victim matching the address in victim address register, the reuse is detected, the value of accumulator is recorded as a reuse distance, and the accumulator is reset (403). In response to the new miss from the victim being at a different address, the replacement of the address in the victim address register and the reset of accumulator may happen with probability $P_v=1/\min(W, N+1)$, where W may be the associativity of the cache, and N may be the value in the accumulator (404). In response to the miss from a non-victim process happening, it is determined whether the miss is from the same non-victim process as the current one (405). In response to the process being the same as the current one, the accumulator is increased (406). In response to the process being different from the current one, the accumulator may be reset and the non-victim process register may be replaced with probability $P_{nv}=1/(N+1)$, referring to 407 of FIG. 4.

B. Score Recorder

The score recorder 231 increases the reuse scores of the cache sets 310 and the non-victim processes based on the received reuse distance values. The score recorder 231 analyzes the temporal and spatial patterns of the reuse score of each process and notifies a prefetch controller when the suspicious pattern emerges. The prefetch controller may be included in the defense actuator 230. The prefetch controller may be configured to issue instructions to the prefetcher 232. In some examples, the prefetch controller may configure the prefetcher 232 with address requests, which helps to defend against side channels. The value of $\min(d, U)$ is added to the current score of the cache set of the non-victim process in response to reuse distance d being observed. Upper bound U on single score increment can make the score recorder focus more on the repetitiveness of nonzero reuse distance than the number of misses between two reuse. In some examples, 1 may be used as the upper bound since it can capture every implementation of cache timing channel.

The cache timing channel may show suspicious spatial and temporal patterns. When the spy is stealing the information, the victim may suffer more conflict misses on the critical memory lines and the misses of spy may appear between two consecutive misses of the critical memory lines. These activities may make the score of spy in the exploited cache sets increase rapidly. The scores for the cache sets where the critical memory lines map may increase much faster than for the other cache sets accessed by the victim. The variability of score increase rate among cache sets may increase when a cache timing channel (i.e., cache timing channel attack) emerges. The maximum reuse score increase and the variability of scores (i.e., the variability of score increase rate) can reveal the existence of cache timing channel.

When a cache timing channel (i.e., cache timing channel attack) emerges, the variability of score among cache sets is increased, as compared to benign processes. The increased variability of score reveals that the spy targets a specific group of memory lines of victim. The maximum reuse score increase captures the high slope of increasing score of the spy when it starts attacking the victim. When a cache timing channel (i.e., cache timing channel attack) emerges, the maximum reuse score increase is higher than the maximum reuse score increase of benign processes. In response to the adversary being detected, the score recorder 231 notifies the security prefetcher 232 to start prefetching and block cache timing channel.

C. Obfuscation Through Hardware Prefetcher

The security prefetcher 232 receives a notification from the score recorder in response to the spy being identified. The security prefetcher 232 may inject noise to the cache timing channel by obfuscating the access pattern on critical memory lines. The prefetcher 232 may prefetch the victim's memory line when it observes the cache miss of spy in the cache set where the critical memory line maps to. In some examples, the victim's memory line may be in the main memory; and after being prefetched, the victim's memory line may be in the cache.

Figure 5A:
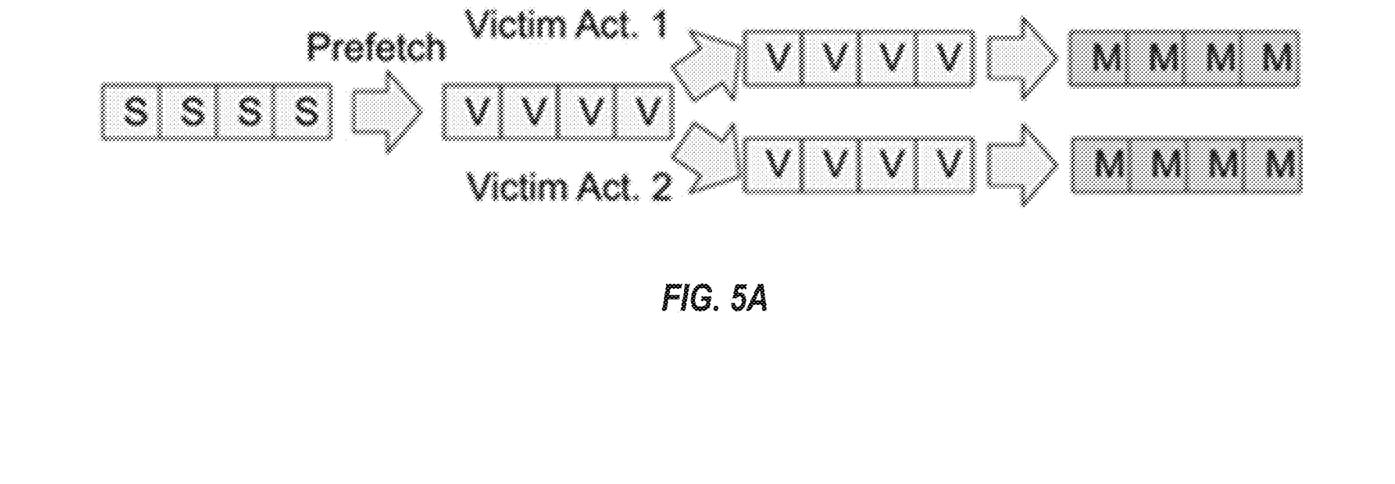
FIG. 5A shows an example method of obfuscating probe-based attack.
Figure 5B:
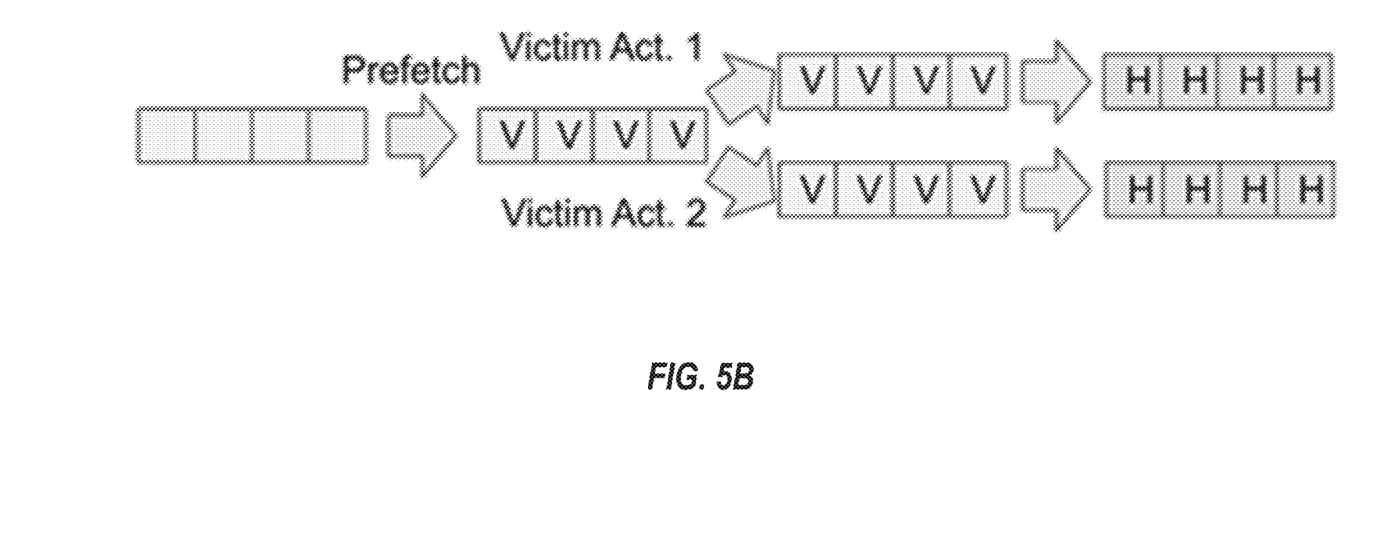
FIG. 5B shows an example method of obfuscating reload-based attack.

FIG. 5A shows an example method of obfuscating probe-based attack. FIG. 5B shows an example method of obfuscating reload-based attack. The S-blocks stand for memory lines from the spy, and V-blocks stand for memory lines from the victim. The H-blocks stand for cache hits, and M-blocks stand for cache misses. The prefetching makes the observation result of the spy independent of the activity of victim. In the example of FIG. 5A, when the spy implements a probe-based attack, the spy observes cache misses on its own memory lines regardless of the activities (e.g., Victim Act. 1 or Victim Act. 2) of the victim. In the example of FIG. 5B, for the reload-based attack, the spy keeps observing cache hits. The security prefetch also may relieve the victim from continuous conflict misses caused by the cache timing channel.

IV. Implementation Against Speculation-Based Side Channel

The maximum amount of leaked information in single iteration of speculation-based attack is limited since the leaking load instruction is executed within a short attack window. Many proposed attack instances (such as Spectre v1, Spectre v2, Meltdown, Foreshadow, ZombieLoad) leak 1 byte information (with maximum 4 bytes) in each iteration while the byte accuracy may be as low as 70%. To recover sufficient amount of correct information, the adversary has to repeat attack activities for multiple times.

Certain attacks may rely on squashed load instructions to leak secret to cache and leverage cache timing channel to observe the cache status change. There may be two critical events: cache misses during the spy's observation and squashed load instructions during the victim's leakage. A prefetcher can obfuscate the observation of cache status when it knows addresses of exploited memory lines. In some examples, to provide fine-grained information for the defense actuator, the marker candidate is defined as cache miss; and the squashed load instructions are defined as target events. The attribute of these events are the address of the memory line and the ID of source security domain.

Figure 6:
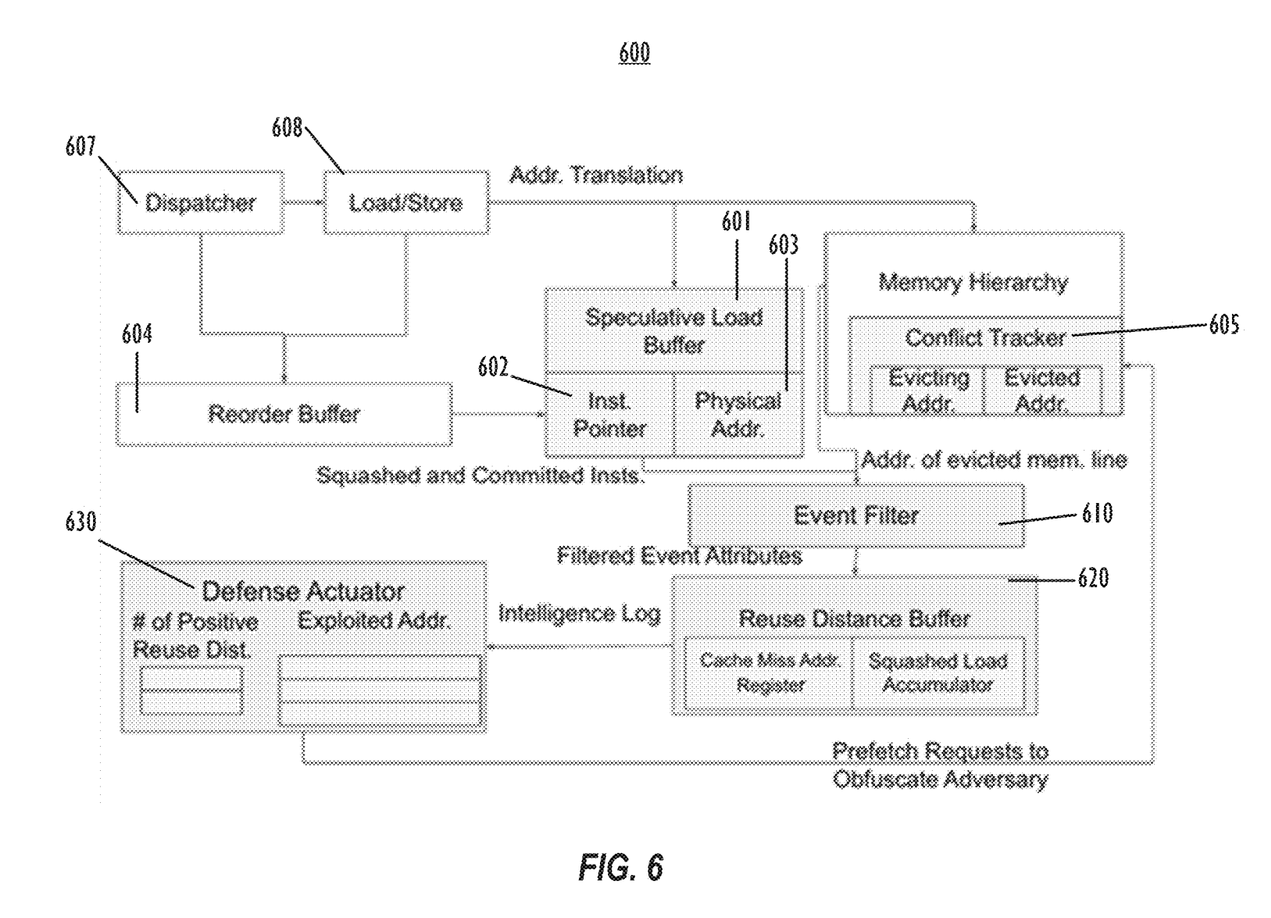
FIG. 6 illustrates an example implementation of a defense system against speculation-based side channels according to various disclosed embodiments.

FIG. 6 illustrates an example implementation of a defense system 600 against speculation-based side channels. Speculative load buffer 601 and conflict tracker 605 collect information from the vulnerable microarchitecture. Speculative load buffer 601 tracks the instruction pointers 602 and target physical addresses (addr.) 603 of potential mis-speculated load instructions (target events). Conflict tracker built in the cache records memory addresses of memory lines suffering conflict misses (marker candidates). The collected information of marker candidates and target events are sent to an event filter 610. The event filter 610 filters attributes of events and forwards the filtered attributes of events to a reuse distance buffer 620. The reuse distance buffer 620 records reuse distance values. A defense actuator 630 identifies adversary and obfuscates information leakage using prefetch requests. The defense system 600 further includes a hardware instruction dispatcher 607 configured to send instructions to relevant functional units in order to execute them, and a load/store circuit or module 608 that is configured to handle and execute load and store instructions relating to memory operations.

A. Speculative Load Buffer

Speculative load buffer 601 tracks mis-speculated load instructions which are defined or considered as target events.

The attribute of squashed load instruction is the physical address of its target memory line. Speculative load buffer 601 maintains a table of instruction pointers of load instructions and their target physical addresses. Speculative load buffer 601 is noticed or notified when a load instruction is installed, retired or squashed in reorder buffer (ROB) 604. The number of entries in the table of speculative load buffer 601 equals to the number of entries of ROB 604.

In examples of installing load instruction, when a load instruction is installed in ROB 604, the speculative load buffer 601 pick an empty entry and fill in the instruction pointer of the newly installed load. The physical address field remains empty since the address translation is usually not completed at this point.

In examples of translating address, when a virtual address of a load instruction is translated into physical address, the instruction pointer 602 of the load instruction along with its target physical address 603 may be sent to the speculative load buffer 601. If the instruction pointer 602 is present in speculative load buffer 601, the physical address field of that load instruction is updated.

In examples of retiring load instruction, when a load instruction retires from ROB 604, it has no risk to leak information through speculation-based side channel. The entry of the retired load instruction can be flushed from the speculative load buffer silently.

In examples of squashing load instruction, when a load instruction is squashed from ROB 604, if its physical address field in speculative load buffer 601 is filled, the physical address is sent to reuse distance buffer 620. In some examples, the physical address may be sent to event filter 610; and if the area also has cache misses, the physical address may be further forwarded to reuse distance buffer 620 by event filter 610.

B. Conflict Tracker

Conflict tracker 605 is built in cache to record conflict misses which are defined as marker candidates. The attribute of conflict miss is the address of the conflict memory line and the ID of the owner security domain. Conflict tracker 605 maintains a table with two columns which records the addresses of evicting memory lines and evicted memory line when cache evictions happen. When a cache miss occurs, if the address of the incoming memory line matches address of a previously evicted memory line, the conflict miss is identified and sent to reuse distance buffer. The addresses of evicted memory lines recorded by conflict tracker 605 is forwarded to defense actuator 630 so that an obfuscating prefetch can be issued when an exploited memory line is evicted.

C. Event Filter

Event filter 610 identifies the cache region with both target events and marker candidates and forwards the information of events occurred in such regions. Since the granularity of speculation-based side channel is one cache set when the adversary implements prime+probe protocol to extract information, the event filter in this case study uses one hash function to map events to entries of the Bloom filter.

D. Reuse Distance Buffer

In some examples, the reuse distance of a cache set may be defined as the number of squashed load instructions whose target physical addresses map to the cache set between two consecutive cache misses of the same memory line in the cache set. To record reuse distance, two types of registers for each cache set may be used, one for storing addresses of cache misses and ID of the source security domain and another one for counting the number of squashed loads that target the cache set between two repetitive cache misses.

E. Defense Actuator

Figure 7:
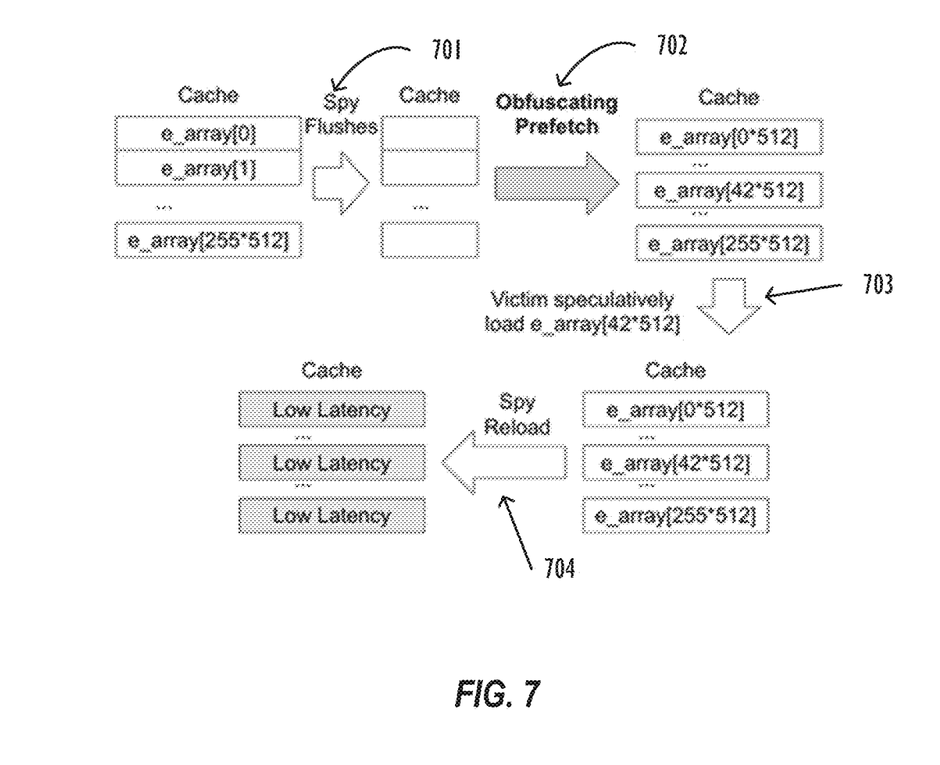
FIG. 7 illustrates an example of a prefetch controller obfuscating speculation-based side channel according to various disclosed embodiments.

Defense actuator 630 identifies adversary which implements speculation-based side channel and obfuscates the information leakage by delivering prefetch requests. Defense actuator 630 maintains a list of positive reuse distance for different security domains. The defense actuator 630 updates its information when it receives reuse distance from reuse distance buffer. If the number of positive reuse distance samples of a security domain exceeds a predetermined threshold, it may be determined that adversary (spy) which implements speculation-based side channel is identified. when a newly recorded reuse distance value from the process is positive, the address of the related memory line may be stored FIG. 7 illustrates an example of a prefetch controller obfuscating speculation-based side channel. Referring to FIGS. 6 and 7, the defense actuator 630 prefetches the exploited memory lines (e_array) at 702, after the spy removes them from the cache at 701. Since exploited memory lines have already been in the cache, the speculative load (703) does not change the cache status. When the spy reloads (704), the spy observes multiple cache hits. The spy cannot distinguish which memory line is brought by leaking speculative load.

IV. Implementation Against Branch Predictor Side Channel

A spy process may execute three branches in a same direction during a prime phase and may execute two branches during a probe phase in a direction opposite to the direction in the prime phase. During the prime and probe phases, the spy may change the predictor status at least twice. Victim branch may be executed between the prime phase and the probe phase. To extract the pattern using a defense system consistent with the present disclosure, in some examples, marker candidate is defined as two continuous changes of branch predictor status in a same direction caused by a non-victim process (potential spy), and target event is defined as the execution of the victim branch.

Figure 8:
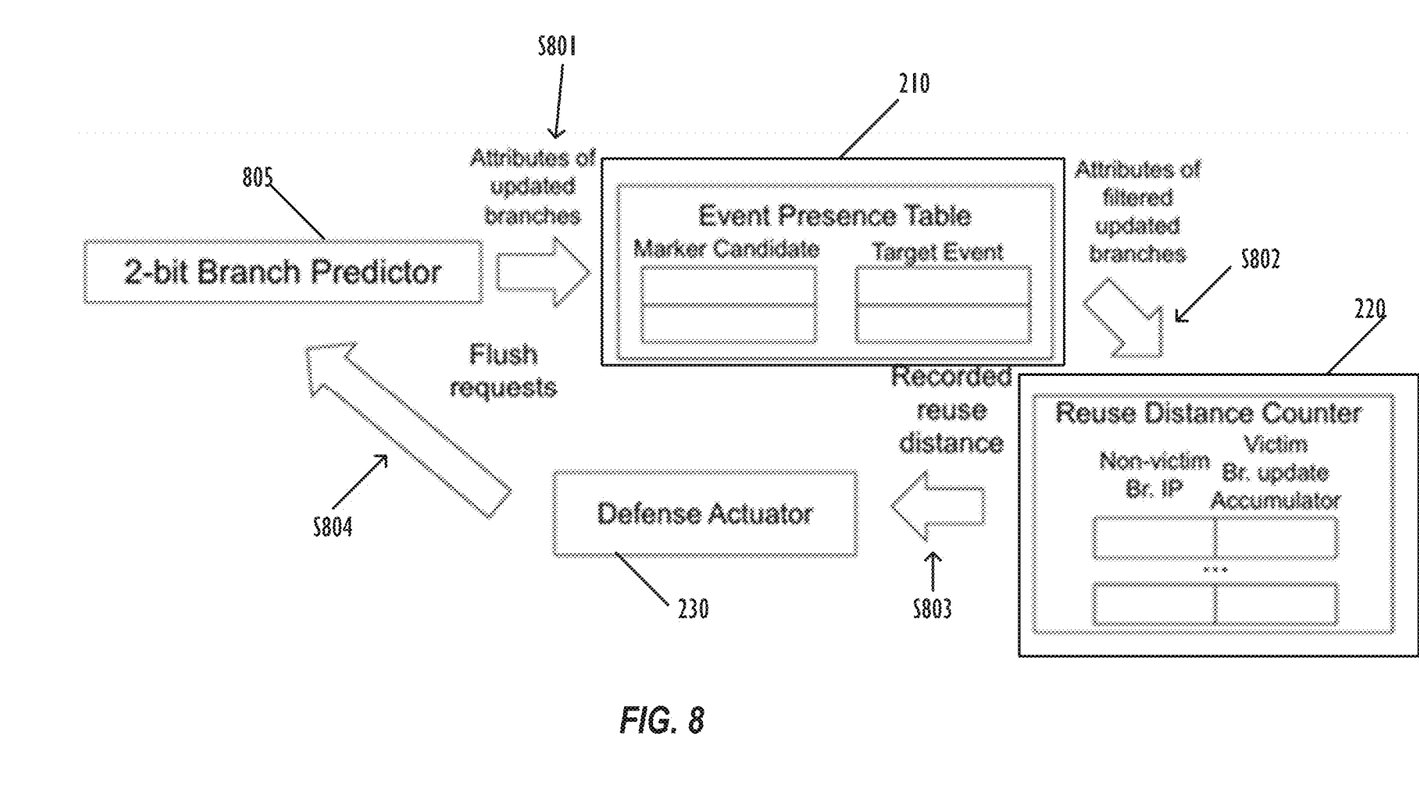
FIG. 8 shows an example use of an example defense system for detection of BranchScope side channel according to various disclosed embodiments.

FIG. 8 shows an example use of an example defense system for detection of BranchScope side channel. The defense system may be the same as or similar to the system 200. The event filter 210 identifies surveillance areas where marker candidate and target event coexist. The information of branch predictor update in those surveillance areas is forwarded to reuse distance buffer 220 after filtering (S802 in FIG. 9). Reuse distance buffer 220 measures the reuse distance and sends the recorded reuse distances to the defense actuator 230 (S803). Defense actuator 230 identifies potential adversary and mitigates information leakage through detected side channels.

A. Event Filter

The branch predictor 805 identifies two consecutive status changes (marker candidate) by maintaining two registers in each entry. The registers track the thread ID and the direction of the last status update. The instruction pointer, thread ID and the type of observed events are sent to event filter 210 (e.g., S801). Since the granularity of BranchScope attack is one of the entries in branch predictor 805, the event filter 210 may use one hash function to map events to the entries of the filter. The filtering and forward strategy are similar to, e.g., the above descriptions associated with defending speculation-based side channel. References can be made to the above descriptions.

B. Reuse Distance Buffer

The marker attribute stored in the reuse distance buffer 220 is or includes instruction pointer (IP) of non-victim branches (Br.) and the ID of its security domain. The number of the predictor updates caused by victim is counted for reuse distance. In the present disclosure, target or marker candidates may be chosen according to various application scenarios. In some examples, rare events in benign workload may be chosen as marker candidates, and accordingly the overhead of tracking such events may be reduced. In certain examples, the consecutive status changes may be relatively rare in benign workload, and may be chosen as marker candidates.

C. Defense Actuator

Defense actuator 230 analyzes the log form reuse distance buffer and deploys mitigation strategy against identified side channel. Defense actuator 230 records the number of positive reuse distance samples for each non-victim security domain. When the number of positive reuse distance samples of a security domain exceeds a predetermined threshold, the process is identified as potential spy.

Given the index of exploited branch predictor entry and the ID of adversary process, the defense actuator may mitigate the side channel by flushing the entry after the victim process accesses it (S804). Another example defense is to assign the victim process and the adversary to different cores which do not share a same branch predictor.

In some examples, the defense system 200 (e.g., in FIG. 2) self-synchronizes itself to the attack frequency or the occurrence frequency of marker events of attack, by dynamically adjusting the sampling according to the occurrence frequency of marker events of attack. The attack frequency may be the frequency of iterations of the attack or adversary, e.g., the number of attack iterations in one second. The attack or adversary may repeat its interference with the victim multiple times, and sufficient and accurate information may be extracted. The occurrence frequency of marker events of attack may be, for example, the number of iterations of marker events in one second.

In some examples, the detector 260 may obtain (e.g., track) the attack frequency via, e.g., the reuse distance buffer 220. The detector 260 may obtain (e.g., track) the attack frequency via, e.g., the reuse distance buffer 220, when the detector 260 tracks the marker events. In certain examples, the detector 260 may obtain the attack frequency by tracking the marker events, and further sample upon occurrence of the marker events.

In some examples, the defense actuator 230 maintains a table with two columns: a column for security domain ID and another column for the number of positive reuse distance samples. When the reuse distance of given domain is received from the reuse distance buffer 220, the table is updated. The detector 260 may record the number of positive reuse distance samples of each application domain (e.g., security domain). If the number of positive reuse distance samples of an application domain does not exceed a predetermined threshold, the detector 260 may continue sampling upon occurrence of the marker events. In response to the number of positive reuse distance samples between repetitive marker events within a security domain exceeding the predetermined threshold, it may be determined by the detector 260 that an attack involving potential side channel activity occurs in the security domain, and further the detector 260 may activate defense strategy to obfuscate the identified side channel activity. By repeating such process, the occurrence of multiple attacks can be determined. Further, the attack frequency can be obtained according to the occurrence of multiple attacks and a time period corresponding to the occurrence of multiple attacks. In certain examples, the reuse distance buffer 220 may obtain the attack frequency, sample the reuse distance and send information of the attack frequency and the reuse distance to the defense actuator 230.

In some examples, the detector 260 record the number of target events occurred between a pair of marker events. When marker events occur, if it is a repetitive one, the detector 260 may sample the number of target events via the reuse distance buffer 220. The detector 260 may perform the self-synchronization via the reuse distance buffer 220, by tracking repetitive marker events and sampling upon occurrence of the marker events. The reuse distance buffer 220 may perform the self-synchronization, as it tracks marker events and samples the number of target events. The reuse distance buffer 220 may synchronize the sampling frequency with the attack frequency according to observed occurrence of the marker events.

In certain examples, as the attack frequency is changed (e.g., increased or decreased), the occurrence frequency of marker events of attack is changed. Accordingly, the reuse distance buffer 220 may perform the self-synchronization (e.g., synchronizing the sampling frequency with the attack frequency) by changing sampling or sampling frequency according to the changed occurrence frequency of marker events of attack. More specifically, as the attack frequency is increased (or decreased), the occurrence frequency of marker events of attack may be increased (or decreased) correspondingly. Accordingly, the reuse distance buffer 220 may perform the self-synchronization by increasing (or decreasing) the sampling or sampling frequency according to the increased (or decreased) occurrence frequency of marker events of attack. In some examples, the reuse distance buffer 220 may adjust the sampling frequency, such that the sampling frequency may be equal to the occurrence frequency of marker events of attack. In certain examples, the reuse distance buffer 220 may send the information of the sampling frequency to the defense actuator 230.

In some examples, a marker event triggers self-synchronizing. For example, the reuse distance buffer 220 may perform self-synchronizing in response to a marker event being observed. In certain examples, via tracking marker events, the detector 260 can synchronize with the adversary without prior knowledge of the attack configuration. The self-synchronization can increase the detection accuracy, e.g., when the attack frequency is unknown. Further, the self-synchronization can reduce the need for precise configuration by an external entity such as system administrator or security monitor.

In some examples, event filtering is performed to reduce the number of marker candidates for synchronization, so as to relieve the workload of synchronizing step and increase the detection accuracy.

According to, e.g., the evaluation on the defense system (such as system 200) by configuring Gem5 (i.e., a cycle-accurate simulator) with four x86 cores, 32 KB private L1 and 512 KB, 8-way shared L2 caches, and full system mode under Linux kernel version 2.6.32, the defense system of the present disclosure can detect side channel variants robustly without prior knowledge of frequency of the adversarial activities. The system can be applied to side channels leveraging different microarchitecture since the synchronizing method is based on critical activity, the repetitive interference, of the side channels. The system can provide abundant information to proposed defense framework to enable surgical defense which has negligible influence on benign workloads running on the same system.

The system (such as system 200) and method of the present invention may include operation by one or more processing devices. It is noted that the processing device can be any suitable device, such as a computer, server, mainframe, processor, microprocessor, controller, PC, tablet, smartphone, or the like. The processing devices can be used in combination with other suitable components, such as a display device (monitor, LED screen, digital screen, etc.), memory device, input device (touchscreen, keyboard, pointing device such as a mouse), wireless module (for RF, Bluetooth, infrared, WiFi, etc.). The information may be stored on a computer medium such as a computer hard drive, on a CD ROM disk or on any other appropriate data storage device, which can be located at or in communication with the processing device.

The system and method of the present invention is implemented by computer software that permits the accessing of data from an electronic information source. The software and the information in accordance with the invention may be within a single, free-standing computer or it may be in a central computer networked to a group of other computers or other electronic devices. The information may be stored on a computer hard drive, on a CD ROM disk or on any other appropriate data storage device.

It will be apparent to those skilled in the art having the benefit of the teachings presented in the foregoing descriptions and the associated drawings that modifications, combinations, sub-combinations, and variations can be made without departing from the spirit or scope of this disclosure. Likewise, the various examples described may be used individually or in combination with other examples. Those skilled in the art will appreciate various combinations of examples not specifically described or illustrated herein that are still within the scope of this disclosure. In this respect, it is to be understood that the disclosure is not limited to the specific examples set forth and the examples of the disclosure are intended to be illustrative, not limiting.

As used in this specification and the appended claims, the singular forms "a", "an" and "the" include plural referents, unless the context clearly dictates otherwise. Similarly, the adjective "another," when used to introduce an element, is intended to mean one or more elements. The terms "comprising," "including," "having" and similar terms are intended to be inclusive such that there may be additional elements other than the listed elements.

Additionally, where a method described above or a method claim below does not explicitly require an order to be followed by its steps or an order is otherwise not required based on the description or claim language, it is not intended that any particular order be inferred. Likewise, where a method claim below does not explicitly recite a step mentioned in the description above, it should not be assumed that the step is required by the claim.

What is claimed is:

1. A system for defending against a side channel attack, comprising:
   a reuse distance buffer configured to measure one or more reuse distances for a microarchitecture block according to information of marker candidates and information of target events of a microarchitecture block;
   a defense actuator configured to determine existence of a side channel attack in the microarchitecture block according to the one or more reuse distances for the microarchitecture block; and
   an event filter configured to, in response to the microarchitecture block having the marker candidates and the target events, forward the information of the marker candidates and the information of the target events to the reuse distance buffer;
   wherein the reuse distance buffer has:
      a first register configured to store a victim address in response to a first cache miss from a victim;
      a second register configured to store an identity of a non-victim process; and
      an accumulator configured to count a number of cache misses of the non-victim process after the first cache miss.

2. The system of claim 1, wherein the event filter includes:
   an event buffer configured to determine whether the microarchitecture block has the marker candidates and the target events.

3. The system of claim 1, wherein the information of the marker candidates includes attributes of the marker candidates, and the information of the target events includes attributes of the target events.

4. The system of claim 1, wherein the reuse distance buffer includes:
   a marker attribute register configured to store the information of the marker candidates; and
   a target event accumulator configured to count the number of target events in the microarchitecture block.

5. The system of claim 1, wherein the defense actuator is further configured to obfuscate the side channel attack.

6. The system of claim 1, wherein the defense actuator is further configured to:
   update a number of positive reuse distance samples for the one or more reuse distances for the microarchitecture block;
   determine, in response to the number of positive reuse distance samples exceeding a predetermined threshold, existence of a side channel attack in the microarchitecture block;
   obfuscate, in response to the existence of a side channel attack in the microarchitecture block being determined, the side channel attack.

7. The system of claim 1,
   wherein the microarchitecture block includes a cache set.

8. The system of claim 7, wherein the defense actuator includes:
   a score recorder configured to determine existence of the side channel attack in the cache set according to the one or more reuse distances for the cache set.

9. The system of claim 7, wherein:
   the defense actuator further includes a prefetcher;
   the score recorder is further configured to send, in response to the existence of the side channel attack being determined, send an index of the cache set and an identity of the side channel attack to the prefetcher; and
   the prefetcher is configured to obfuscate the side channel attack according to the index of the cache set and the identity of the side channel attack.

10. The system of claim 1, wherein the reuse distance buffer is further configured to record, in response to a victim address of a second cache miss from victim being the same as the victim address of the first cache miss, the number of cache misses of the non-victim process between the first and second cache misses from the victim as a reuse distance.

11. The system of claim 1, wherein:
   the victim address of the first cache miss is a first victim address; and
   the reuse distance buffer is further configured to, in response to a second cache miss having a second victim address that is different from the first victim address of the first cache miss, replace the first victim address in the first register with the second victim address with a probability.

12. The system of claim 1, wherein the accumulator is further configured to increase in response to a non-victim process of a second cache miss being the same as a current non-victim process.

13. The system of claim 1, further comprising:
   a speculative load buffer configured to track the information of the target events of the microarchitecture block, wherein the target events include potential mis-speculated load instructions, and the information of target events include instruction pointers and target physical addresses of the potential mis-speculated load instructions; and
   a conflict tracker configured to record the information of the marker candidates, wherein the information of the marker candidates includes a memory address of a memory line suffering a conflict miss.

14. The system of claim 13, wherein the reuse distance buffer has:
   a first register configured to store an address of a cache miss; and
   a second register configured to count a number of squashed loads between two repetitive cache misses.

15. The system of claim 13, further comprising:
   a branch predictor configured to identify two consecutive status changes.

16. The system of claim 13, wherein the defense actuator is further configured to flush one or more entries of the branch predictor to obfuscate the side channel attack.

17. The system of claim 1, wherein the reuse distance buffer is further configured to perform a synchronization by adjusting a frequency of sampling of the number of target events between repetitive marker events according to an occurrence frequency of the repetitive marker events.

18. The system of claim 17, wherein the reuse distance buffer is further configured to:
   reduce the frequency of sampling of the number of target events in response to the occurrence frequency of the repetitive marker events being reduced; and
   increase the frequency of sampling of the number of target events in response to the occurrence frequency of the repetitive marker events being increased.

* * * * *